No. 768,337. PATENTED AUG. 23, 1904.
M. MILCH.
ALTERNATING CURRENT MOTOR.
APPLICATION FILED DEC. 21, 1903.
NO MODEL.
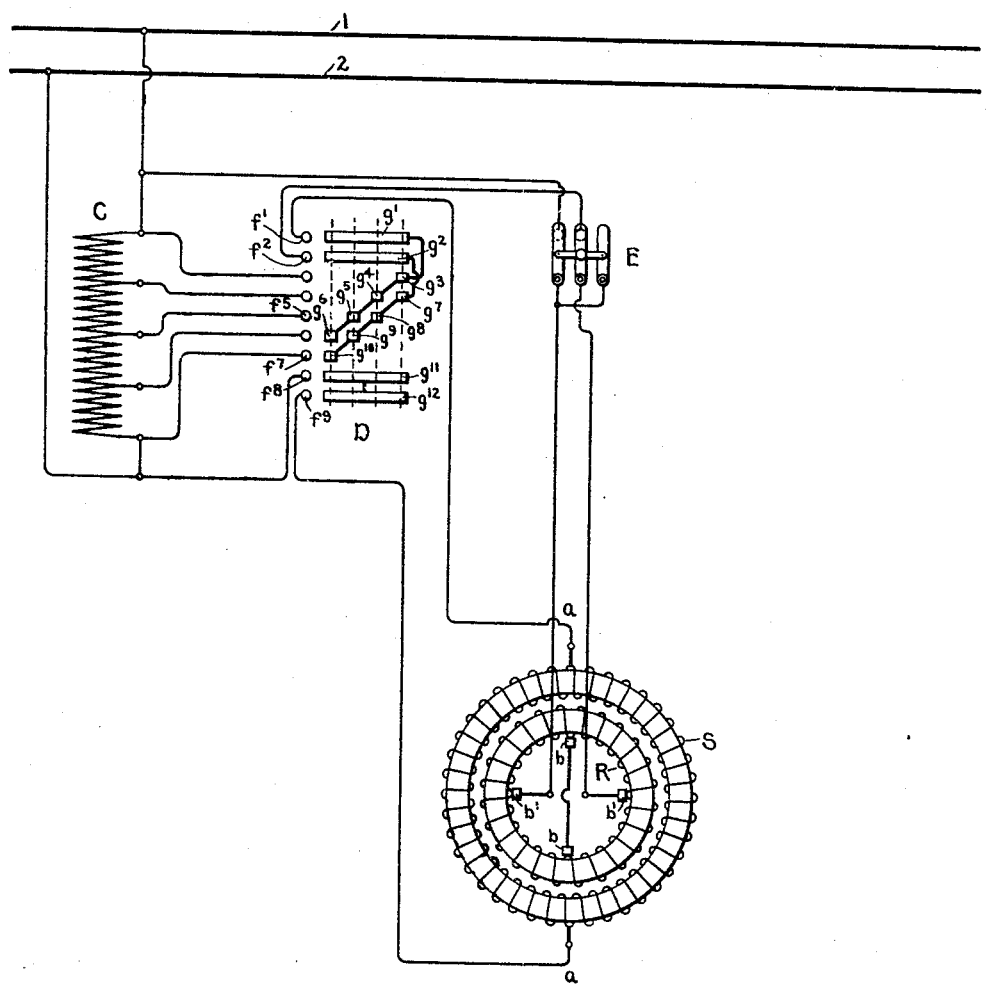
Witnesses
J. Ellis Glenn
Stan Oxford
Inventor
Maurice Milch
By Albert B. Davis
Atty.

No. 768,337.

Patented August 23, 1904.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT MOTOR.

SPECIFICATION forming part of Letters Patent No. 768,337, dated August 23, 1904.

Application filed December 21, 1903. Serial No. 185,943. (No model.)

*To all whom it may concern:*

Be it known that I, MAURICE MILCH, a subject of the King of Hungary, residing at Schenectady, in the county of Schenectady and State of New York, have invented certain new and useful Improvements in Alternating-Current Motors, of which the following is a specification.

My invention relates to the control of alternating-current motors; and its object is to provide a motor and means for controlling it which shall be simple and economical in operation, which shall enable a gradual acceleration and efficient speed-control to be obtained, and which shall enable a plurality of motors to be controlled readily from a single point at a distance from them, thereby meeting the requirements for the control of a plurality of motors on a car or train.

My invention will be best understood by reference to the accompanying drawing, in which is shown diagrammatically a motor and an arrangement of switches and circuits therefor embodying my invention.

In the drawing, S represents the stator of the motor, which in this case I have shown as the primary member. It will, however, be understood that either the stator or the rotor may be used as the primary member.

R represents the rotor or secondary member of the motor provided with two sets of commutator-brushes $b\ b$ and $b'\ b'$. One set of brushes $b\ b$ is disposed upon the line of magnetization produced by the winding of the primary member S—that is, upon the line of the stator-terminal $a\ a$. This set of brushes is short-circuited. The other set of commutator-brushes $b'\ b'$ is disposed approximately ninety electrical degrees from the first-named set and is connected to the controlling-switches.

It will be seen that the parts of the rotor-winding between the brushes $b\ b$ are most favorably disposed for acting as short-circuited secondaries for the primary winding. Accordingly when the motor is at rest a comparatively small electromotive force impressed upon the stator-terminals $a\ a$ will produce a comparatively large current-flow through both primary and secondary windings. The parts of the rotor-winding, on the other hand, between the brushes $b'\ b'$ are so disposed relatively to the primary winding that no current will be induced therein by current in the primary winding. Furthermore, no part of the primary winding is placed so as to act as a short-circuited secondary for these sections of the rotor-winding. Consequently at starting the impedance of these parts of the rotor-winding is high and a comparatively high electromotive force impressed upon the brushes $b'\ b'$ will produce a comparatively small current-flow through the rotor-winding.

It is evident that electromotive forces impressed, respectively, upon the stator-terminals $a\ a$ and upon the rotor-brushes $b'\ b'$ will produce currents which tend to magnetize the motor in directions at right angles to each other. A torque will consequently be produced and the motor will be set in motion. Now as the motor speeds up the parts of the rotor-winding between the brushes $b'\ b'$ will cut the magnetic field produced by the stator-winding and an electromotive force will be produced in these parts of the rotor-winding which will act to diminish the counter electro-motive force of the winding and will permit the flow of a larger current. On the other hand, the parts of the rotor-winding between the brushes $b\ b$ will as the motor speeds up cut the magnetic field produced by the current flowing through the brushes $b'\ b'$, and an electromotive force will be induced therein which will increase the counter electromotive force of the rotor-winding between the brushes $b\ b$. The current flowing through the stator-winding will consequently diminish. For a given load the motor would speed up until the back electromotive force developed in the rotor-windings between brushes $b\ b$, due to the field of the other parts of the rotor-winding, is sufficient to allow just enough current to flow through the stator-winding to carry the load. If now the electromotive force impressed upon the stator-terminals $a\ a$ is increased, a larger current will flow through the stator-winding and a higher speed will be obtained. On the other hand, should the voltage impressed upon the rotor-brushes $b'\,b'$ be diminished the field produced thereby would be weakened and the back electromotive force induced in the winding between the brushes $b\,b$ would be decreased, also permitting the flow of a larger current and an increase of speed. Thus the speed of the motor may be controlled by increasing the impressed voltage on the stator-terminals or by decreasing the impressed voltage on the brushes $b'\,b'$ or by varying both simultaneously.

It will be seen that the behavior of the motor is in many respects similar to a direct-current shunt-motor. The current impressed upon the stator-terminals $a\,a$ and induced in the rotor-winding between brushes $b\,b$ corresponds to the armature-current of the direct-current shunt-motor, and, as in the case of the direct-current shunt-motor, a large armature-current will be produced at starting by a comparatively small voltage. As the motor speeds up, however, a counter electromotive force is produced which cuts down this current in the same way as the armature-current of a shunt-motor is cut down as the motor speeds up. On the other hand, the current flowing through the brushes $b'\,b'$ corresponds to the field-current of the shunt-motor, by the weakening of which the counter electromotive force induced is diminished and a consequent increase of speed obtained.

For the control of my motor I have shown the compensator or other regulating device C, the main controller D, and the reversing-switch E. The main controlling-switch D consists of the stationary contact-fingers $f'\,f^2$, &c., and the moving contacts $g'\,g^2$, &c. With the reversing-switch E in the position shown and with the controller D in its first position the motor-circuits are as follows: from the line-wire 1 through the reversing-switch E to left-hand brush $b'$, through the rotor-winding to right-hand brush $b'$, through reversing-switch E to contact-finger $f^2$, to movable contact-finger $g^2$, movable contact-finger $g^{10}$, contact-finger $f^7$ to line-wire 2. The full-line voltage is thus impressed across brushes $b'\,b'$. At starting, as has been already described, however, the counter electromotive force between these brushes is large and the current-flow is comparatively small. Another circuit is formed with the controller in the first position, as follows: from line-wire 1 through compensator C to contact-finger $f^6$, to movable contact $g^6$, to movable contact $g'$, contact-finger $f'$, upper stator-terminal $a$, through stator-winding to lower stator-terminal $a$, to contact-finger $f^9$, movable contact $g^{12}$, movable contact $g^{11}$, contact-finger $f^8$ to line-wire 2. The voltage of a single section of the compensator C is thus impressed upon the stator-terminals. The impedance of this circuit, however, at starting is very low, as has already been explained, and a comparatively large current will flow through the stator-winding and through the parts of the rotor-windings between the brushes $b\,b$. As the motor speeds up the controller is shifted to its second position. The change made in the circuits, as will be seen from the drawing, is that the connection of right-hand rotor-brush $b'$ through the reversing-switch E and contact-finger $f^2$ is shifted from contact-finger $f^7$ to contact-finger $f^6$, thereby diminishing the voltage impressed upon the brushes $b'\,b'$ by one section of the compensator, while, on the other hand, the connection of upper stator-terminal $a$ through contact-finger $f'$ is shifted from the contact-finger $f^6$ to contact-finger $f^5$, thereby increasing the voltage impressed upon the stator-windings from that of one section of the compensator to that of two sections. The speed of the motor will accordingly increase, as has already been explained. As the controller D is moved through its other positions the voltage impressed upon the brushes $b'\,b'$ is further decreased and the voltage impressed on the stator-winding is increased until in the last position the full voltage of the line-wires is impressed upon the stator-winding, while the voltage of a single section of the compensator C is impressed upon the brushes $b'\,b'$, and the full speed is thus reached.

The function of reversing-switch E is merely to reverse the relative connections of the brushes $b'\,b'$. The direction of rotation may be reversed in this way just as the direction of rotation of a direct-current shunt-motor may be reversed by reversing field connections. As in the case of the shunt-motor, the armature connections may be reversed, if preferred—that is, the relative connections of stator-terminals $a\,a$ instead of the connections of brushes $b'\,b'$ may be carried to the reversing-switch.

While I have shown a single motor, it is evident that any number of motors may be controlled from a single switch D, placed at any distance therefrom, and accordingly my invention is well adapted to the control of a plurality of motors.

Although for the sake of simplicity I have shown a bipolar motor with Gramme windings on both primary and secondary members, it will be understood that my invention is applicable to a motor having any number of poles and any of the well-known forms of winding on either member. Furthermore, any form of voltage-regulating device may be substituted for the compensator C, and numerous other changes may be made in the arrangement without departing from the spirit of my invention.

I do not desire to limit myself to the particular construction and arrangement of parts here shown, since changes therein which do not depart from the spirit of my invention and which are within the scope of the appended claims will be obvious to those skilled in the art.

What I claim as new, and desire to secure by Letters Patent of the United States, is—

1. In combination, an alternating-current motor having its secondary member supplied with a commutator, means for impressing a variable voltage on the primary member, a set of brushes bearing on the commutator on the line of magnetization of the primary member, short-circuiting connections for said brushes, a second set of brushes bearing on the commutator and displaced ninety electrical degrees from the first-named set, and means for impressing a variable voltage on said second set of brushes.

2. In combination, an alternating-current motor having its secondary member supplied with a commutator, means for impressing a voltage on the primary member, a set of commutator-brushes short-circuiting the secondary member on the line of magnetization of the primary member, a second set of commutator-brushes displaced ninety electrical degrees from the first-named set, means for impressing a voltage on the second set, and means for simultaneously varying the voltages impressed on the primary and secondary members.

3. In combination, an alternating-current motor having its secondary member supplied with a commutator, means for impressing a voltage on the primary member, a set of commutator-brushes short-circuiting the secondary member on the line of magnetization of the primary member, a second set of commutator-brushes disposed ninety electrical degrees from the first set, means for impressing a voltage on said second set, and means for simultaneously increasing the voltage impressed on the primary member and decreasing the voltage impressed on the secondary member.

4. In combination, an alternating-current motor having a primary and a secondary member, a source of alternating voltage, a switch arranged to connect said source to said primary member and to points on the secondary member displaced ninety electrical degrees from the points of connection of the primary member and adapted by its movement to simultaneously increase the voltage impressed on the primary member and decrease the voltage impressed on the secondary member, and means for short-circuiting the secondary member on the line of magnetization of the primary member.

5. In combination, an alternating-current motor having a primary and a secondary member, a source of alternating voltage, means for connecting said source to both members of the motor, the points of connection of one member being displaced ninety electrical degrees from the points of connection of the other member, means for simultaneously increasing the voltage impressed on the primary member and decreasing the voltage impressed on the secondary member, and means for short-circuiting the secondary member on the line of magnetization of the primary member.

6. In combination, an alternating-current motor having a primary and a secondary member, a source of alternating-current voltage, a switch adapted to connect said source to the primary member to impress thereon a minimum voltage and to connect said source to said secondary member to impress a maximum voltage thereon at points displaced ninety electrical degrees from the points of connection of the primary member and to simultaneously increase the voltage impressed on the primary member and decrease the voltage impressed on the secondary member, and means for maintaining the secondary member short-circuited on the line of magnetization of the primary member.

In witness whereof I have hereunto set my hand this 19th day of December, 1903.

MAURICE MILCH.

Witnesses:
BENJAMIN B. HULL,
HELEN ORFORD.